(12) United States Patent
Chan et al.

(10) Patent No.: US 10,547,852 B2
(45) Date of Patent: Jan. 28, 2020

(54) SHAPE-ADAPTIVE MODEL-BASED CODEC FOR LOSSY AND LOSSLESS COMPRESSION OF IMAGES

(71) Applicant: Versitech Limited, Hong Kong (CN)

(72) Inventors: Shing Chow Chan, Hong Kong (CN); Zhouchi Lin, Hong Kong (CN); An Ling Liu, Hong Kong (CN)

(73) Assignee: Versitech Limited, Hong Kong (CN)

( * ) Notice: Subject to any disclaimer, the term of this patent is extended or adjusted under 35 U.S.C. 154(b) by 10 days.

(21) Appl. No.: 15/441,530

(22) Filed: Feb. 24, 2017

(65) Prior Publication Data

US 2017/0251214 A1    Aug. 31, 2017

Related U.S. Application Data

(60) Provisional application No. 62/300,502, filed on Feb. 6, 2016.

(51) Int. Cl.
| | |
|---|---|
| *H04N 7/18* | (2006.01) |
| *H04N 11/02* | (2006.01) |
| *H04N 11/04* | (2006.01) |
| *H04N 19/159* | (2014.01) |
| *H04N 19/13* | (2014.01) |
| *H04N 19/14* | (2014.01) |
| *H04N 19/182* | (2014.01) |

(52) U.S. Cl.
CPC ........... *H04N 19/159* (2014.11); *H04N 19/13* (2014.11); *H04N 19/14* (2014.11); *H04N 19/182* (2014.11)

(58) Field of Classification Search
None
See application file for complete search history.

(56) References Cited

U.S. PATENT DOCUMENTS

| | | | |
|---|---|---|---|
| 5,774,596 A | 6/1998 | Kim | |
| 5,881,183 A | 3/1999 | Lee | |

(Continued)

FOREIGN PATENT DOCUMENTS

| | | |
|---|---|---|
| CN | 1210429 A | 3/1999 |
| CN | 1386376 A | 12/2002 |
| CN | 103313053 A | 9/2013 |
| KR | 10-2011-0035082 A | 4/2011 |

OTHER PUBLICATIONS

Ostermann, J., "Core experiments on MPEG-4 video shape coding," International Standards Organization, ISO/IEC/JTC1/SC29/WG11 N 1584 (1997).

(Continued)

*Primary Examiner* — Talha M Nawaz
(74) *Attorney, Agent, or Firm* — Saliwanchik, Lloyd & Eisenschenk

(57) ABSTRACT

The present invention relate to methods and codecs for image and video compression. Embodiments of the present invention include a novel shape-adaptive model-based codec (SAM) that supports binary shapes as well as matte and soft segmentation image compression by decomposing input shapes into deterministic and stochastic components for flexible lossy and lossless coding. The present invention can provide inter/intra prediction and flexibly adapts between lossy and lossless modes with various parameters for compression quality control. The compression module can also be adapted with numerous other compression techniques.

17 Claims, 4 Drawing Sheets

(56) References Cited

U.S. PATENT DOCUMENTS

| | | | |
|---|---|---|---|
| 6,081,554 A * | 6/2000 | Lee | G06T 9/20 375/240 |
| 6,421,386 B1 * | 7/2002 | Chung | H04N 19/00 375/240.24 |
| 6,594,310 B1 * | 7/2003 | Marques | G06T 9/001 375/240 |
| 2003/0112867 A1 * | 6/2003 | Hannuksela | H04N 19/174 375/240.08 |
| 2004/0218669 A1 * | 11/2004 | Hannuksela | H04N 19/107 375/240.01 |
| 2006/0204117 A1 | 9/2006 | Sekino et al. | |
| 2006/0251321 A1 * | 11/2006 | Kryeziu | H04N 19/46 382/166 |
| 2009/0110281 A1 * | 4/2009 | Hirabayashi | G06K 9/00993 382/180 |
| 2012/0119927 A1 * | 5/2012 | Zhang | H03M 7/3066 341/79 |
| 2017/0060904 A1 * | 3/2017 | Pau | G06F 16/5838 |

OTHER PUBLICATIONS

Ostermann, J., Coding of Binary Shape in MPEG-4, AT&T Labs-Research, https://www.tnt.uni-hannover.de/papers/data/368/368_1.pdf.

Coding of Audio, Picture, Multimedia and Hypermedia Information, ISO/IEC JTC 1/SC 29, N 1941, Mar. 6, 1997, p. 4, WG11 N1584, https://www.tnt.uni-hannover.de/papers/data/368/368_1.pdf.

Brady, N. et al., Context-based Arithmetic Encoding of 2D Shape Sequences, Special Session on Shape coding, pp. 29-32, 1997 IEEE.

Supplementary European Search Report dated Jul. 10, 2019 in European Application No. 17755817.8.

International Search Report and Written Opinion dated May 10, 2017 in International Application No. PCT/CN2017/074433.

* cited by examiner

SHAPE-ADAPTIVE MODEL-BASED CODEC FOR LOSSY AND LOSSLESS COMPRESSION OF IMAGES

CROSS-REFERENCE TO RELATED APPLICATION

This application claims the benefit of U.S. Provisional Application Ser. No. 62/300,502, filed Feb. 26, 2016, which is hereby incorporated by reference in its entirety, including any figures, tables, or drawings.

FIELD OF THE INVENTION

The present invention is concerned with the compression of shape information, such as binary shapes, matte or soft segmentation images, in objects within a video sequence in scenarios such as TV broadcasting or movies. It provides both lossless and lossy coding of shape information and thus allows for tradeoffs between bit rates and accuracy of shape representation (resolution). Intra and inter coding is also available to further improve coding efficiency in compression.

BACKGROUND OF THE INVENTION

Major discontinuities in shapes are generally represented in the form of shape images, each of which is an image indicating the amount of the foreground and background defined by the major discontinuities. This is also called a matte or soft segmentation image, and is frequently used to define the amount of foreground at a particular pixel location in blue screen techniques. It can be an 8-bit image with a value ranging from 0 to 255, which indicates the soft membership or opacity of this pixel, with 0 having no contribution (i.e. transparent) and 255 having full contribution (i.e. completely seen). If only the geometric shape of the object is needed, then the shape image can be simplified to a binary image with pixels assuming a value of 0 or 1, which is also referred to as binary shapes/binary alpha plane. The latter is of interest in data compression when the available bit rate is limited.

To date, there is no shape codec specifically tailored for coding matte and soft segmentation images. They are generally treated as grey-scaled images and are coded using image compression algorithms. Such an approach is unable to utilize the structural redundancies of the matte and soft segmentation images in compression. For the binary shapes, there are two state-of-the-art coding approaches, i.e., the contour-based method and block-based methods. In contour-based methods, the contour of the shape is first traced clockwise (or counterclockwise) and segmented into multiple line pieces as the smallest processing unit. Encoding and decoding processes are applied sequentially to each unit such that a contour is formed. This is followed by a filling process to reconstruct original shape information. However, a major short-coming of the contour-based methods is that they require substantial pre-processing; however, their compression ratio is lower than that of block-based methods in their lossless mode. As a result, block-based methods are more popular.

In block-based approaches, the binary shape is bounded by rectangles of the same size that include the shapes of the video object plane (VOP), a.k.a. the bounding box. Such rectangles will later be divided into regular macroblocks, a.k.a. micro-processing units, in each of which the alpha values of the pixels are encoded/decoded using entropy coding methods. However, a major limitation of block-based approaches is that blocks with same size are employed and they are aligned in the same direction. Consequently, some of the blocks may inevitably contain no information concerning the contour, but they still consume storage space (redundant blocks). These redundancies generally limit the compression ratio of the block-based methods, especially in high resolution images.

BRIEF SUMMARY OF THE INVENTION

The present invention is designed to provide a solution for video shape codecs that requires more bit rate flexibility and also provide better visual quality as well as shape details. There are many applications for the present invention including the compression of depth maps for view synthesis in 3D video processing. By applying the techniques of the present invention, inaccuracies of the reconstructed edges can be further adjusted according to their texture. In particular, the shape codec of the present invention can adjust bit rates while minimizing inaccuracies on the shape boundary, which cause visual artifacts, especially where the image contains complex textures. In such a case, shape boundaries (if the shape comes with texture) can be coded with different levels of accuracy according to their texture to reduce the number of artifacts.

In many applications, such as video compression, the object shape has to be compressed. Conventional shape coding in MPEG-4 is based on context-based arithmetic coding (CAE), which is an efficient lossless method for compressing the binary alpha plane of the desired object shape to be coded. However, as noted above, a major limitation of block-based approaches is that blocks with same shape are employed and they are aligned in the same direction. Consequently, some of the blocks may inevitably contain full 0s or 255s. Although some block-based methods can be used to compress such data, a substantial amount of redundancies will still remain in the transmitted data. In HD video such as 1080p or 4K resolution, such redundancies can be large and thus require a lot of storage space. In the lossy compression mode, they degrade the resolution of macroblocks and reduce the information to be stored. This results in annoying staircase effects (aliasing). On the other hand, the contour approach only approximates the shape of an object using vertices and parametric curves. As a result, it is unable to capture the unpredictable or stochastic fluctuations of a non-smooth edge.

In contrast to these conventional methods, the proposed shape-adaptive model-based (SAM) codec of the present invention not only supports parametric model representation of an original shape but also allows coding the residual error using either Differential pulse-code modulation (DPCM) or other block-based methods. As a result, the present invention is able to achieve high compression quality by dividing the binary alpha plane into deterministic and stochastic components and provides the flexibility of choosing between lossless and lossy compression modes. Moreover, its deterministic component is also effective in many image/video applications that require smooth transitions.

Unlike conventional methods, the shape-adaptive model-based codecs (SAM) of the present invention can have some or all of the following distinctive features:

1. Unlike conventional shape codecs, which support only binary shapes/binary alpha planes, the present invention is able to code binary shapes, matte and soft segmentation images. To support semi-transparent objects in the case of a binary shape image, the proposed invention also includes the mean opacity of the object. The exact opacity at the boundary will be estimated from the input and other essential information of the auxiliary data. In general, more simplification of the opacity can be included in the case of binary shape image. In coding real-valued matte and soft segmentation images, if the variation of the matte is very small, it will be represented using just a mean value and will be coded in a fashion similar to a binary shape. Otherwise, non-overlapping blocks, which can be coded using block-based image coding techniques, will be used to code the real-valued matte using the proposed SAM. The ability to code matte and soft segmentation data allows overlapping of objects in the foreground and background. This provides more flexibility for the user to deal with occlusion of objects, e.g., using in-painted data, which leads to better reconstruction of objects in 3D rendering.

2. The shape is decomposed into deterministic and stochastic components for flexible lossy and lossless coding. Rather than the conventional binary alpha plane coding, which is lossless and relies on probabilistic approaches, the proposed codec decomposes the shape into deterministic and random-like stochastic components. The former arises from the geometric nature of objects, such as man-made objects, which can be better represented by parametric models like spline curves and polygons; whereas for the latter, it is used to represent the random-like components, such as feathers, hairs and etc.

3. A flexible procedure for identification of deterministic and stochastic components is proposed. In particular, a method is proposed to identify the deterministic and stochastic components and their block sizes from the shape of the objects. Moreover, it provides the flexibility to choose between a lossless and a lossy compression mode for each component. Unlike conventional methods, this invention allows a tradeoff between compression ratio and quality for each component, which is essential in high resolution applications.

4. The deterministic component, which models the contour of the shape within a preset accuracy, provides not only a compressed representation of the shape, but also allows effective registration of similar shapes. The continuous nature of parametric models further allows smooth transition in applications like image super-resolution, frame rate up-conversion, morphing of shapes, etc.

5. The stochastic component can be coded using arithmetic coding or other methods if lossless compression is required. Alternatively, the shape can be decimated into a lower resolution shape image and coded before up conversion. This process is lossy but generally leads to a higher compression ratio. In particular, it is proposed that a rotated micro-processing unit be employed when a block-based method is applied for compressing the stochastic component. This can lead to a significant increase in the compression ratio of the stochastic component.

6. The present invention allows for the ability to perform prediction and coding of related shapes, e.g., at adjacent views or time instants. This allows the proposed codec to improve the compression ratio by exploring the statistical redundancies among similar shapes.

BRIEF DESCRIPTION OF THE DRAWINGS

The foregoing and other objects and advantages of the present invention will become more apparent when considered in connection with the following detailed description and appended drawings in which like designations denote like elements in the various views, and wherein:

FIG. 1 is an example of in-painting of foreground where

DETAILED DISCLOSURE OF THE INVENTION

An image is a representation of visual perceptions, which may be two-dimensional (2D), such as a photograph or screen display. It may also be three-dimensional (3D), such as stereo images. In general, 3D images can also be represented as multiple 2D images, or a 2D image with a deformation/depth map. Hence, the shape processing of the present invention can be considered for 2D images for simplicity. However, in general, these processing techniques can also be extended to the processing of 3D or stereo images.

Figures 1A, 1B, 1C, 1D:
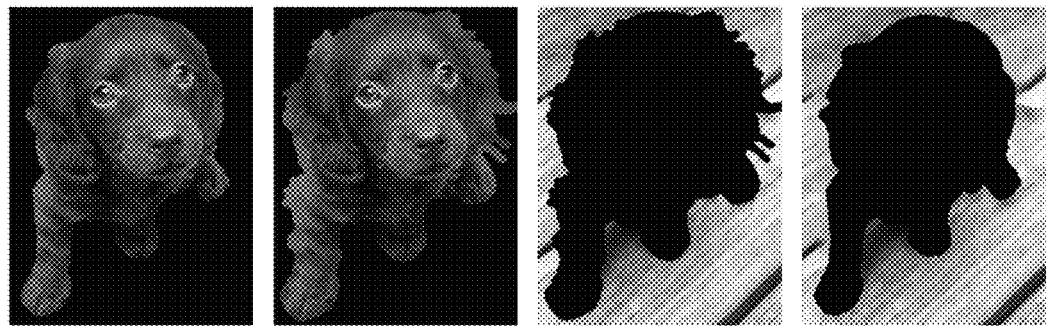
FIG. 1(a) shows an original foreground.
FIG. 1(b) shows an in-painted foreground at unknown areas.
FIG. 1(c) shows an original background.
FIG. 1(d) shows an in-painted back ground at unknown areas.

To understand the techniques of the present invention it is helpful to understand inpainting. FIG. 1 is an illustration of that demonstrates this concept. Inpainting (also known as image interpolation or video interpolation) refers to the application of sophisticated algorithms to replace lost or corrupted parts of the image data (mainly small regions or small defects). FIGS. 1 (a) and (c) shows the original foreground and background, respectively. Notice that there are some areas that have been missed on both the foreground and background. This might be caused by matting or a segmentation tool used to process the image. In order to estimate the possible foreground and background texture of these areas, image inpainting is employed to create the corresponding texture, as shown in FIGS. 1 (b) and (d). Thus, FIG. 1(a) shows the original foreground, while FIG. 1(b) shows an in-painted foreground at certain areas. Notice the additional foreground elements to the right of the dog's face and to the left of the dog's leg. FIG. 1(c) shows the original background with random defects to the left and right side. FIG. 1(d) shows inpainting to remove those defects.

Figure 2:
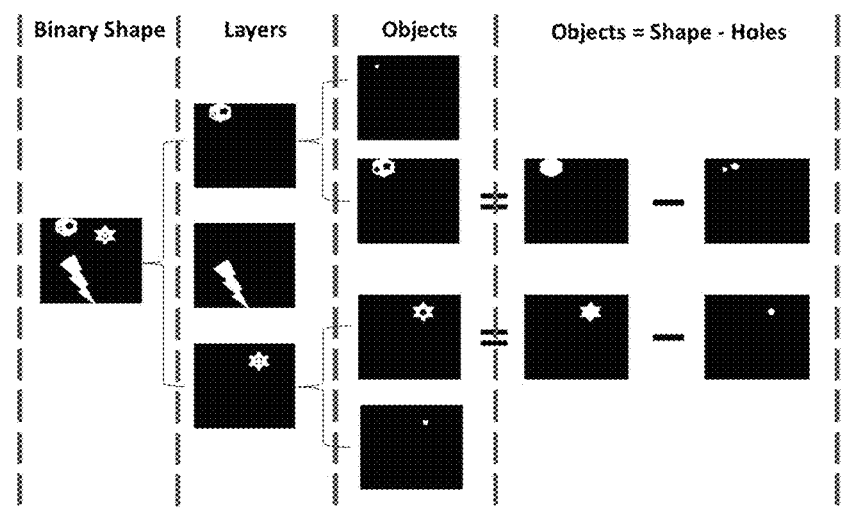
FIG. 2 is an example of dividing input shapes into shape layers before plugging the shapes one by one into a SAM shape codec for compression.

FIG. 2 shows an example of input shapes. From the figure, it can be seen that the binary shapes can be divided into different layers, which may contain multiple objects. Each object may be represented as shapes and holes.

Figure 3:
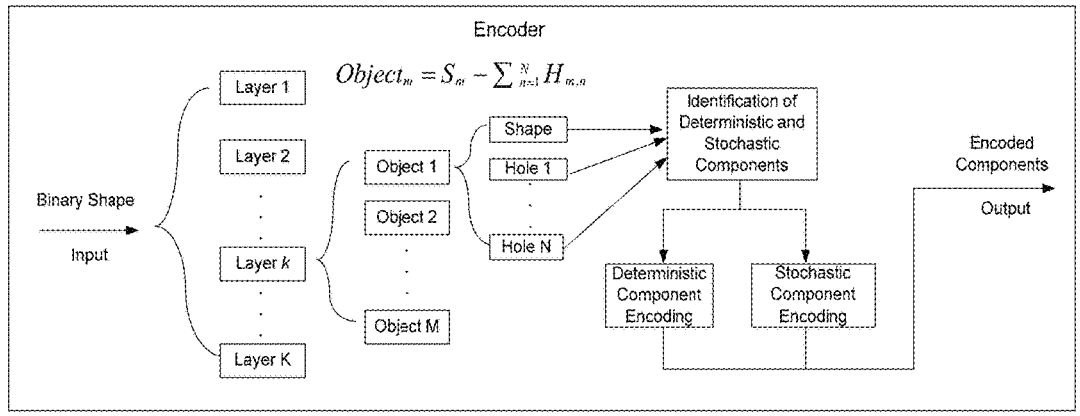
FIG. 3 is an overview of a SAM codec of the present invention.

FIG. 3 shows an overview of the proposed codec. Its encoding process can be generally divided into three major steps as follows:

1. Separation of input shapes into different layers and objects: Given a binary alpha plane (Binary Shape Input in FIG. 3), which may possibly contain multiple layers indicating several objects with pre-defined index, the input shape information can first be separated into multiple layers. Within each layer (Layers 1, 2 . . . k . . . K in FIG. 3), there could be some isolated objects (regions that are non 0 and are topologically un-connected, neither 4-connected nor 8-connected). In such a case, the objects can be separated and processed sequentially. For each of the objects that contain holes (Hole 1, ... N in FIG. 3), these holes can be subtracted from the representation, as we can see from the images of FIG. 1.

More precisely, the representation of an object can be given as:

$$\text{Object}_m = S_m - \Sigma_{n=1}^{N_m} H_{n,m}, \quad (1)$$

where $S_m$ is the shape of the m-th object $\text{Object}_m$, m=1, 2, ..., M, defined by the outer boundary of the original shape, which is equivalent to the original shape having undergone a morphological filling process $H_{m,n}$, n=1, 2, ..., $N_m$ are holes within the m-th object, which are the regions filled under the morphological filling process previously mentioned, and are arranged in a descending order according to their size.

2. Identification of deterministic and stochastic components: After obtaining the shapes and holes, as shown in FIG. 2, a method is proposed to identify the deterministic and stochastic components and their block sizes from the shape of the objects. The details on how these components are identified are discussed below.

3. Encoding of the deterministic and stochastic components: Different methods can be used to further compress the deterministic and stochastic components. The former arises from the geometric nature of objects such as man-made objects, which can be better represented by parametric models like spline curves and polygons. Whereas for the latter, it is used to represent the random-like components such as feathers, hairs, etc. In particular, the invention employs a rotated micro-processing unit when a block-based method is applied for compressing the stochastic component. The details of how the deterministic and stochastic components can be encoded are discussed below.

Identification of Deterministic and Stochastic Components

In a method according to the present invention, the first step can be to obtain the boundary of the solid shapes. For example, morphological filtering can be performed on the shape by removing all pixels where their 4-connected neighbors are non-zero, thus leaving 8-connected boundary pixels. All of the vertices on the boundary can be traversed and stored in a point list. Line segments can be generated from the set of point lists. Afterwards, the following two steps can be performed to obtain the deterministic and stochastic components:

1. Extraction of the line segments from the object: Line segments can be obtained using a polygon fitting procedure, e.g., iteratively, including the vertices until the line fitting error exceeds a certain tolerance. However, preferably, this procedure should be directly applied to this problem as the stochastic components may have a large fitting error, which may exceed the specified tolerance. To overcome this limitation, a new method according to the present invention can be used to segment the shape contour as follows:

a. For each pixel on the shape contour, a sliding window can be employed to include its neighboring pixels so that the degree of smoothness of the line segment formed by the pixels and its neighbor can be measured, e.g., by comparing their least-squares fitting error. Then, this fitting error can be assigned to the pixel as a degree of smoothness.

b. The degree of smoothness obtained from each pixel can then be clustered into two groups. Adjacent pixels in the same group can be connected together to form a line segment.

Figure 4:
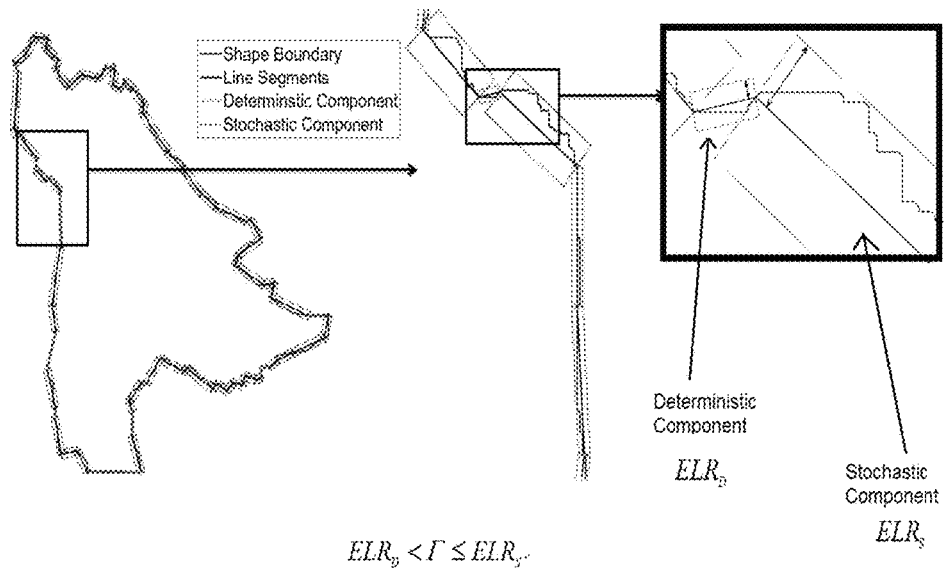
FIG. 4 illustrates the process of identification of deterministic and stochastic components of a binary shape.
Figure 5:
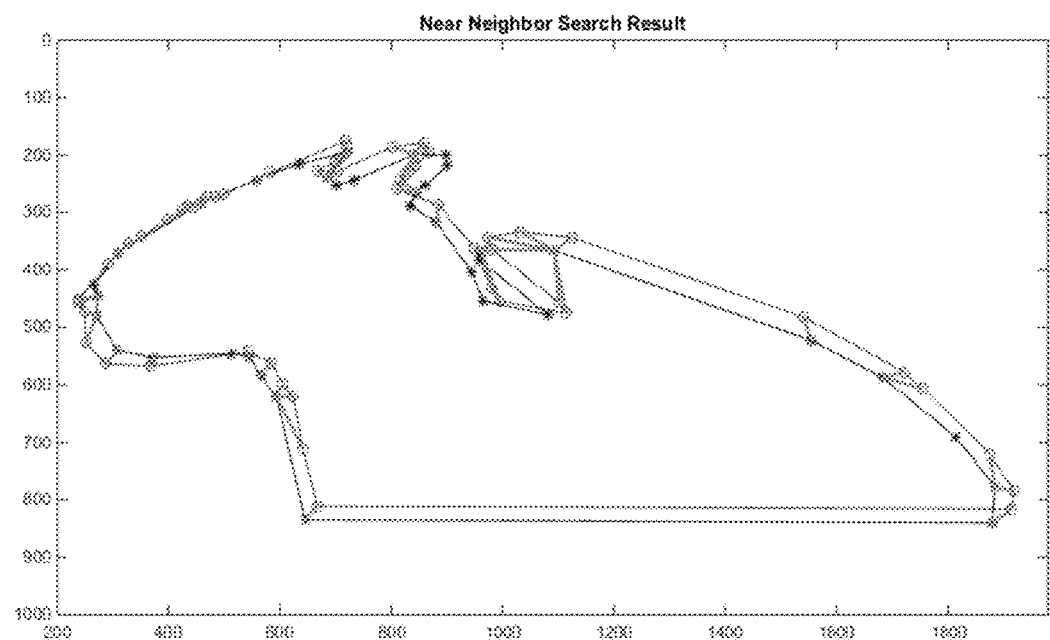
FIG. 5 shows an example of inter prediction as used with the present invention.

2. Identification of deterministic and stochastic component: After obtaining the line segments, a parametric model, such as a polygon, piecewise polynomial, B-spline, etc., can be used to fit the line segments. Since the deterministic component is generally smooth and can be better represented by the parametric model, the resulting approximation error will generally be much smaller than that of the stochastic component. By comparing the approximation error with a certain threshold, the line segments can be separated into deterministic and stochastic components. FIG. 4 shows an example of the identification of deterministic and stochastic components with approximation error measurements, such as error to segment length ratio (ELR), denoted by $ELR_D$ and $ELR_S$ respectively. As shown in FIG. 4, the boundary of an irregular shape is plotted with line segments. A portion of the boundary is shown with both medium and high magnification. Where the difference between the line segment and the object boundary is small, the component is deterministic (arrow in the Deterministic Component $ELR_D$). Where the difference is large, the component is stochastic (arrow in the Stochastic Component $ELR_S$).

The key to identifying the components is to determine a suitable threshold (arrows showing the differences in the greatly enlarged view in FIG. 4). To this end, a statistical detection test, such as the z-test, is employed to determine these thresholds. The threshold can be chosen as $\Gamma = \min(\Gamma_{ADAPTIVE}, \Gamma_{USER})$ where $\Gamma_{ADAPTIVE}$ is an adaptive threshold determined from the statistical test and $\Gamma_{USER}$ is a user specified maximum tolerance error to ensure certain compression quality. An advantage of choosing the minimum of the adaptive $\Gamma_{ADAPTIVE}$ and user specified threshold $\Gamma_{USER}$, i.e., $\Gamma = \min(\Gamma_{ADAPTIVE}, \Gamma_{USER})$ is that it provides the flexibility to switch between the adaptive and user specified thresholds. When the shape of the object is generally random-like, $\Gamma_{ADAPTIVE}$ might be even larger than the user specified tolerance $\Gamma_{USER}$. It will generally be beneficial to override the adaptive threshold and label most of the line segments as stochastic components. This ensures all the components will be able to meet the specified tolerance as the stochastic component exceeding the specified tolerance can be coded with lossless compression, whereas the deterministic component can be represented by the parameters of a parametric model and the approximation error will be smaller than that of the specified tolerance. Otherwise, when the object is generally smooth and can be well represented by the parametric model, $\Gamma_{ADAPTIVE}$ will be small and most of the line segments will be identified as deterministic, except some occasional random-like line segments, which will have an ELR exceeding the threshold.

More specifically, suppose there are m=1, 2, ..., M objects, each of the objects contains $J_m$ vertices, and each of the pixels is assigned a mean squared error $MSE_{j,m}$ after performing a least squares fit in the sliding window. Clustering is performed to divide the $MSE_{j,m}$ into two groups. Adjacent pixels belonging to the same group are joined to form a line segment and the mean of the $MSE_{j,m}$ of these pixels, denoted as $MMSE_{k,m}$ is a smoothness measure of the resulting line segment. Suppose $K_m$ segments are obtained for each of the objects, the following measures are taken for identifying the deterministic and stochastic components, i.e., the error to segment length ratio (ELR), $$ELR_k = \frac{MMSE_k}{J_k}, \quad (2)$$

where $J_k$ is the total number of vertices of the k-th line segment. When a line segment can be well represented by the parametric model, say a B-spline, Bezier curve and etc., $MMSE_{k,m}$ will be small and the number of vertices included in the segment can be large. This will lead to a small ELR and hence it can be regarded as a deterministic component. Otherwise, a random-like segment such as a feather or hair will have a large approximation error and then should be regarded as a stochastic component.

A statistical detection test, such as a location test, can be used to determine whether the k-th line segment is deterministic or stochastic. For example, the ELR can be written as $ELR_{m,k}$, where k=1, 2, ..., $K_m$ and m=1, 2, ..., M, and an adaptive threshold $\Gamma_{ADAPTIVE}(m)$, which can be updated according to the smoothness of objects and can be obtained as $ELR_{k,m}$.

$$\Gamma_{ADAPTIVE}(m), \mu\Gamma_{ADAPTIVE}(m)+(1-\mu)k_\xi\sigma_m, \text{ and}$$
$$\Gamma_{ADAPTIVE}(1)=k_\xi\sigma_1, \quad (3)$$

$$\sigma_m = \text{median}(|ELR_{m,k} - \text{median}(ELR_{m,1}, ELR_{m,2}, \ldots ELR_{m,K_m})|), \quad (4)$$

where $\sigma_m$ is a robust scale estimate of $ELR_{k,m}$ of the m-th object, $\mu$ is a forgetting factor, and $k_\xi$ is a threshold quartile parameter corresponding to the upper $(1-P\{X>\xi\})$ percentile of the Gaussian distribution. Hence, the probability that the parameter $P\{X>\xi\}=(2/\pi)\int_\xi^\infty e^{-x^2} dx$. For a significance level of 0.05, $k_\xi=1.96$ can be chosen. median(.) is the median operator. The following robust z-test can be employed as a decision rule for identifying deterministic or stochastic components.

If $ELR_{m,k} - \text{median}(ELR_{m,1}, ELR_{m,2}, \ldots ELR_{m,K}) > \min(\Gamma_{ADAPTIVE}(m), \Gamma_{USER})$, (5)

the k-th line segment is stochastic.

where the threshold $\min(\Gamma_{ADAPTIVE}(m), \Gamma_{USER})$ provides the flexibility to switch from the adaptive threshold or the user specified threshold $\Gamma_{USER}$.

Coding of the Deterministic Components

After identifying the deterministic component, the shape of the deterministic component can be further represented using a parametric model, say a polygon, piecewise polynomial, B-spline, etc. More specifically, the coordinates of the pixels on the k-th line segment, $$\begin{pmatrix} x_j \\ y_j \end{pmatrix},$$

j=1, 2, ..., $J_k$ can be modeled as $$\begin{pmatrix} x_j \\ y_j \end{pmatrix} = f_k(a_k, j) + e_j, \quad (6)$$

where $f_k(a_{k,m}, j)$ is a function that describes the relationship between the vertex number j and the coordinate of the j-th vertex. In general, this concept can be generalized into a vertex in a higher dimension, such as a 3D coordinate. $a_k$ is a vector containing the parameters of the function for the k-th line segment. For example, if a spline model is used, $a_k$ may obtain the control knots of the spline curve and the chosen order. $e_{j,k}$ is the approximation error and it can be used to identify the deterministic and stochastic components. The k-th deterministic component can be represented by the parameter $a_k$.

Intra/inter prediction of the parameters of adjacent components can be performed to further increase the compression ratio. For example, if the parameters are integers, such as positions of vertices, they can be coded sequentially and their position can thus be represented as the position of their previous vertices plus a displacement. Generally, if the magnitude of the displacement is much smaller than that of the vertices' coordinates (ranging from 0 to the size of the image), fewer bits will be required to code the displacement and this will reduce storage in practice. Intra prediction is similar to inter prediction but differs in the way the displacement is retrieved. The displacement, in this case, is defined by the difference between the coordinate of the current vertex in the P frame and the nearest vertex in the I frame. In practice, the selection between inter mode and intra mode will be determined by the value of displacement. Inter vertices prediction is similar to that of intra prediction except that in inter prediction the reference vertices are not in sequential order but are calculated as the nearest corresponding vertices in the reference frame using either iterative closest point (ICP) or free-form deformation (FFD). Given the corresponding reference vertices, the predicted vertices can be represented as the reference vertices plus displacement, similar to that in intra vertices prediction.

Whereas for intra/inter prediction of real-valued parameters of adjacent components, e.g. coefficients of a parametric model, the real-valued parameters of the current components are regarded as reference parameters to predict the coefficients of the subsequent components. Afterwards, the prediction residual is encoded and stored rather than the original coefficients. A high compression ratio can be achieved if the range of the prediction residual is much smaller than that of the original coefficients. More precisely, one may first scale and quantize the real-valued parameters into fixed-point integers. Afterwards, the prediction residual, i.e., the difference between the parameters of the current component and that of the subsequent component, are computed and stored. For example, a variable scale and differential category coding approach can be employed for intra-prediction of the categories of the floating point parameters, which explores the redundancies among the order of the parameters and is able to further improve the compression ratio of the intra-prediction. Inter prediction of parametric model coefficient can be achieved similarly.

The parametric representation, also known as the deterministic component, gives more flexibility in lossy compression of a shape. The shape can be easily down-sampled and up-sampled without generating a staircase effect or blocking artifacts. Moreover, the parametric representation of a boundary is continuous. Hence, it not only allows an arbitrary number of interpolated boundary points within the curve, but it is also effective in shape registration for smooth shape transition. As a result, it can be employed in applications such as video streaming and live broadcasting on wireless networks and mobile phone networks, which have much lower bandwidth than that of a wired network and hence a high compression ratio of video content is required to achieve low latency in streaming. Moreover, image and video processing techniques like super-resolution or morphing can also be directly achieved using parametric representation of shapes.

Coding of the Stochastic Component

In a SAM codec of the present invention, the stochastic component can be coded using, e.g., block based methods or chain code. Similar to that of the deterministic component, depending of the chosen coding method, e.g., content-based arithmetic coding, the user can specify a block size to achieve whatever coding performance is desired. Thus, the program should further break each stochastic component to fit in a block size $B_S$ before coding starts.

Figure 6:
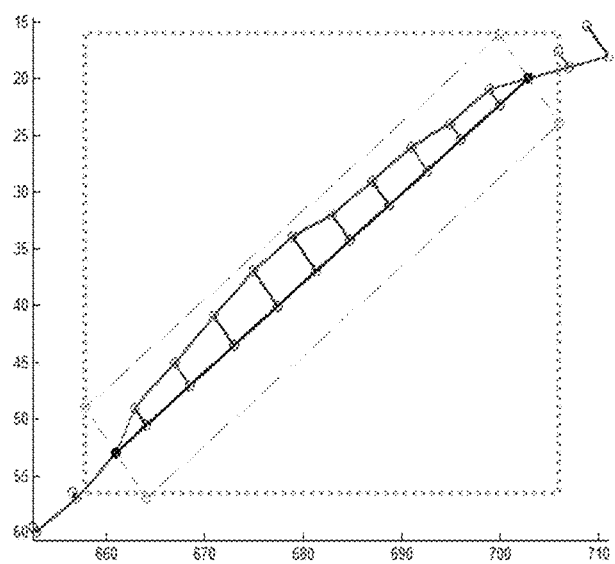
FIG. 6 is an example of a discrete stochastic component of the present invention.

If the stochastic component is coded using a block-based method (FIG. 6), a rotated micro-processing unit with variable size can be used. The orientation of the unit can be optimized for achieving a high compression ratio for a block-based method, such as entropy coding or content-based arithmetic coding algorithms. This is in contrast to the conventional block-based methods, the micro-processing units of which are either aligned horizontally or vertically and hence there are more redundancies among the micro-processing units due to the fact that some do not contain shape information. Other methods like chain code, or DPCM, can also be applied to code the residual. This interchangeable nature of coding methods in stochastic components gives the codecs of the present invention more flexibility of bit rate control in different applications.

The coding of stochastic components allows the user to choose between lossless or lossy compression modes. In lossless compression is required, it can be coded using arithmetic coding or other methods. Alternatively, the shape can be decimated into a lower resolution shape image and coded before up conversion. This process is lossy but generally leads to a higher compression ratio.

For inter/intra prediction of stochastic components, predictions similar to vertices prediction for the deterministic component can be performed to estimate the position of the start point and end point of the component region. The component itself, either coded by chain code or block based methods, can apply its inter prediction methods. In particular, to compress the temporal and spatial redundancy, the position of the component region can be predicted by the previously coded value as an intra/inter prediction. Codecs according to the present invention can use any conventional coding method to compress the stochastic and deterministic component, such as a chain code or block based method. For example, if CAE is applied to the stochastic component compression, a block matching method for inter prediction can be employed.

Mode Selection

In a SAM codec of the present invention, a shape can be separate into two major components: stochastic components and deterministic components. Generally, for each component in the shape boundary, the user is free to choose between lossless and lossy compression modes. For example, a choice can be made to code the deterministic component in lossy mode and code the stochastic component in lossless mode. Thus, a smoothed boundary would be obtained on long curves with fluctuation, while still maintaining a complex boundary, also known as the stochastic component. On the other hand, if no loss of shape information is allowed, the user can choose the lossless mode of the codec. In this case, the codec will regard all line segments as stochastic components for simplification.

Data Structure

Figure 7:
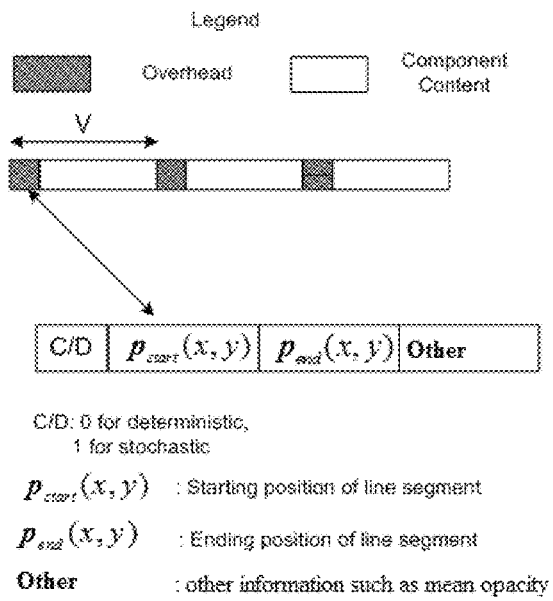
FIG. 7 is an example of a data structure of the present invention.
Figure 8:
FIG. 8 illustrates several images within a dataset for a proof of concept application of the present invention.
Figure 8:

FIG. 7 shows the data structure of the compressed data. It consists of overhead and stochastic components. The overhead contains a header file, starting and end points of the micro-processing unit (i.e., the component) and other information such as mean opacity. If a deterministic component is chosen, the component content will contain the parameters of the parametric model. Otherwise, it will contain the coded data obtained from the chosen coding algorithm for the stochastic component.

Experimental Results

Table 1 shows experimental results of lossless compression between a SAM codec of the present invention and the CAE method, which is a state-of-the-art lossless algorithm for compression. To make a fair comparison, only the lossless compression mode of the SAM codec was compared with the CAE method, since it is a lossless algorithm. A distinctive feature that codecs of the present invention can have is flexibility in choosing between lossless and lossy compression modes.

In the experiment, a linear model was used for deterministic component modeling, thus there will not be any deterministic component after identification, but stochastic components separated by boundary segmentation. The stochastic components were further separated into smaller blocks and CAE was used for stochastic component coding. The block size, BS, was set to 10 pixels in the experiment. The experimental comparison used the CAE method in MPEG4. It can be seen from Table I that the lossless compression of the present invention has performance that is generally better than the CAE method.

TABLE 1

Lossless Compression Result (bytes)

| | | Proposed SAM Codec | | | |
| No. | Resolution (pixel) | Overhead (bits) | Stochastic Component | Total | CAE |
| --- | --- | --- | --- | --- | --- |
| 1 | 923 × 777 | 202 | 607 | 809 | 1043 |
| 2 | 923 × 777 | 224 | 1388 | 1612 | 1350 |
| 3 | 960 × 804 | 194 | 525 | 719 | 944 |
| 4 | 1280 × 828 | 124 | 798 | 922 | 967 |
| 5 | 1920 × 816 | 181 | 688 | 869 | 1433 |
| 6 | 1920 × 816 | 260 | 835 | 1095 | 1191 |
| 7 | 3760 × 2120 | 539 | 10042 | 10581 | 8733 |
| 8 | 4096 × 1716 | 362 | 2152 | 2514 | 5871 |

While the invention has been particularly shown and described with reference to preferred embodiments thereof, it will be understood by those skilled in the art that various changes in form and details may be made therein without departing from the spirit and scope of the invention. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all implementations falling within the scope of the appended claims, and equivalents thereof.

REFERENCES

The following documents are incorporated by reference to the extent that they are not inconsistent with the teachings disclosed herein.

Ostermann, J. "Core experiments on MPEG-4 video shape coding," *International Standards Organization*, ISO/IEC/JTCI/SC29/WG11 N 1584 (1997).

Rabbani et al., "Digital Image Compression Techniques," SPIE, *Int. Soc. Opt. Eng.*, (1991).

Brandy et al., "Context-based arithmetic encode of 2D shape sequences," *Special Session on Shape Coding*, ICIP 97 (1997).

What is claimed is:

1. A method for image compression, comprising the steps of:

separating binary shape images into layers and objects;
subtracting holes from a representation of the objects;
identifying deterministic and stochastic components, and block sizes of the object based on shapes of the objects;
encoding the deterministic components of each object based on parametric models; encoding the stochastic components of each object; and
combining the encoded components to provide a compressed encoded output, wherein the representation of the objects is $$\text{Object}_m = S_m - \Sigma_{n=1}^{Nm} H_{n,m},$$

where $S_m$ is the shape of the m-th object $\text{Object}_m$, m=1, 2, ..., M, defined by the outer boundary of the original shape, which is equivalent to the original shape having undergone a morphological filling process, and $H_{m,n}$, n=1, 2, ..., $N_m$ are holes within the m-th object, which are the regions filled under the morphological filling process previously identified and are arranged in a descending order of their size.

2. A method for image compression, comprising the steps of:

separating binary shape images into layers and objects;
subtracting holes from a representation of the objects;
identifying deterministic and stochastic components, and block sizes of the object based on shapes of the objects;
encoding the deterministic components of each object based on parametric models; encoding the stochastic components of each object; and
combining the encoded components to provide a compressed encoded output,
wherein the step of identifying the deterministic and stochastic component comprises the steps of:
obtaining a boundary of the solid shapes;
storing vertices on the boundary in a point list;
generating line segments from the vertices of the point list; extracting the line segments from the object;
fitting a parametric model to the line segments;
calculating an approximation error between the parametric model and the line segments of the object; and
comparing the approximation error with a threshold, wherein line segments below the threshold are taken as deterministic components and line segments above the threshold are taken as stochastic components.

3. The method of claim 2, wherein the step of obtaining the boundary is achieved by removing all pixels of the object having 4-connected neighbors that are non-zero, and leaving 8-connected boundary pixels.

4. The method of claim 2, wherein the step of extracting the line segments comprises:

employing a sliding window for each pixel on the shape boundary to include its neighboring pixels so that a degree of smoothness of the line segment formed by the pixels and its neighbor can be measured; and
clustering the degree of smoothness obtained from each pixel into two groups such that adjacent pixels in a same group can be connected together to form a line segment.

5. The method of claim 4, wherein the step of measuring the degree of smoothness is achieved by comparing a least-squares fitting error.

6. The method of claim 2, wherein the parametric model is one or more of a polygon, a piecewise polynomial, and a B-spline.

7. The method of claim 1, wherein the parametric model is one or more of a polygon, a piecewise polynomial, and a B-spline.

8. The method of claim 1, wherein the coding of the stochastic components is achieved with block based methods or chain code.

9. The method of claim 1, wherein the coding of the stochastic components is achieved with a block-based method using a rotated micro-processing unit with variable size, and an orientation of the rotated micro-processing unit is optimized using entropy coding or a content-based arithmetic coding algorithm for achieving a high compression ratio for a block-based method.

10. The method of claim 1, further comprising a step of intra/inter prediction of parameters of adjacent components to further increase the compression ratio, whereby components are coded as a displacement from a previous vertice.

11. The method of claim 1, wherein a lossless and a lossy compression mode can be selected independently for the deterministic components and the stochastic components.

12. The method of claim 1, wherein the compressed encoded output has a data structure that includes:

overhead that includes a header file, starting and end points of a micro-processing unit,
including component information and mean opacity; and
if a deterministic components is chosen, parameters of the parametric model.

13. A coding algorithm codec for lossy and lossless compression of binary images, the codec including a method comprising:

separating binary shape images into layers and objects;
subtracting holes from representations of the objects;
identifying deterministic and stochastic components, and block sizes of each object based on shape of the objects;
encoding sequentially the deterministic components of each object based on parametric models;
encoding sequentially the stochastic components of each object; and
combining the encoded components to provide a compressed encoded output,
wherein the step of identifying the deterministic and stochastic components is performed by: obtaining a boundary of solid shapes;
storing in a point list all vertices on the shape boundary; generating line segments from the vertices in a point list; extracting the line segments from the object; fitting a parametric model to the line segments;
calculating an approximation error between the parametric model and the line segments of the shape boundary; and
comparing the approximation error with a threshold, wherein those line segments below the threshold are deterministic components and those above the threshold are stochastic components.

14. The codec of claim 13, wherein the extracting the line segments includes:

employing a sliding window for each pixel on the shape boundary contour to include its neighboring pixels so that a degree of smoothness of the line segment formed by the pixels and its neighbor can be measured;

assigning a fitting error to the pixels as a degree of smoothness; and clustering the degree of smoothness obtained from each pixel into two groups such that adjacent pixels in the same group can be connected together to form a line segment.

15. The codec of claim 13, wherein the stochastic components are coded with a block-based method using a rotated micro-processing unit with variable size, and an orientation of the rotated micro-processing unit is optimized using entropy coding or content-based arithmetic coding for achieving a high compression ratio for a block-based method.

16. The method of claim 1, wherein the step of separating binary shape images into layers and objects comprises separating the binary shape images into layers and object boundaries, where each of the object boundaries is respectively represented as a sequence of object boundary pixels.

17. The codec of claim 13, wherein the step of separating binary shape images into layers and objects comprises separating the binary shape images into layers and object boundaries, where each of the object boundaries is respectively represented as a sequence of object boundary pixels.

\* \* \* \* \*